United States Patent Office 3,591,622
Patented July 6, 1971

3,591,622
AMALGAM HYDRODIMERISATION OF
ORGANIC COMPOUNDS
Brian John Woodhall, Runcorn, England, assignor to Imperial Chemical Industries Limited, London, England
No Drawing. Filed Jan. 31, 1968, Ser. No. 701,837
Claims priority, application Great Britain, Feb. 7, 1967, 5,842/67
Int. Cl. C07c 121/26
U.S. Cl. 260—465.8                        6 Claims

ABSTRACT OF THE DISCLOSURE $\alpha,\beta$-Olefinically unsaturated nitriles or esters (for example acrylonitrile) are converted to their hydrodimers (for example adiponitrile) by reductive dimerisation employing an "onium" amalgam, for example a quaternary ammonium amalgam.

---

This invention relates to the conversion of $\alpha,\beta$-olefinically unsaturated nitriles (especially acrylonitrile) or $\alpha,\beta$ olefinically unsaturated esters to their hydrodimers (especially adiponitrile) by reductive dimerisation ("hydrodimerisation") in an amalgam reduction system.

A very important contribution to the literature on the subject of amalgam hydrodimerisation of, especially, acrylonitrile is made by Dutch patent specification No. 6504863. This Dutch specification and its equivalents elsewhere represent the only prior art having close relevance to the present invention which is known to the applicant. Reference may be made to the aforementioned prior Dutch specification or an equivalent of it for information on the reaction to which the present invention relates. The most relevant earlier amalgam hydrodimerisation art is contained in the work by Kunyants (or Knoonianats) and co-workers in Bull. Acad., U.S.S.R., Div. Chem. Sci., 1957, 243

The Dutch specification describes a process for hydrodimering $\alpha,\beta$-olefinically unsaturated esters or nitriles, especially acrylonitrile, by means of a reduction system comprising an amalgam of an alkali metal, or alkaline earth metal, a source of active hydrogen, and an "onium" compound, for example an ammonium, phosphonium or sulphonium compound, and especially a quaternary ammonium salt The amalgam is preferably sodium or potassium amalgam and the source of active hydrogen can suitably be, and preferably is, water. Numerous examples of suitable "onium" compounds are given. Marked preference is expressed for quaternary ammonium salts, especially those in which the N atom is bonded to groups of aliphatic character, especially alkyl groups. Special importance attaches to tetraalkyl ammonium salts in which the N atom is attached to at least two lower alkyl groups containing 1 to 4, preferably 1 or 2, carbon atoms. The bulk of any radical not being a lower alkyl radical is limited by the requirement that the quaternary ammonium salt shall remain appreciably soluble in the aqueous medium. Cetyl trimethyl and tetraethyl ammonium salts as well as tetramethyl and trimethyl ethyl ammonium salts are prominently exemplified. The nature of the anion of the salt is treated as a matter of secondary significance but halides and p-toluene sulphonates are preferred on solubility grounds.

A function of the "onium" compound is the suppression of the undesired full reduction of the monomer (e.g. acrylonitrile to propionitrile) and it is believed that this is achieved by reason of preferential adsorption on the amalgam surface. The differing effects of different quaternary ammonium salts can be accounted for on this basis.

The Dutch specification is mainly concerned with a three-component reaction medium (excluding the amalgam) consisting of acrylonitrile, water and a quaternary ammonium salt. The effect of varying the nature and concentration of the quaternary ammonium salt, the pH of the reaction medium, and the concentration of water relatively to the acrylonitrile was studied, and the results obtained showed that the quaternary ammonium salt was effective over a wide range of concentrations with the preferred concentration being within the range of from 10 to 30% by weight based on the reaction medium (less the amalgam).

The pH of the aqueous organic phase was shown to be preferably within the range of from 7 to 9.5; at lower pH values the formation of the fully saturated monomer (propionitrile) became more flavoured and at higher pH values inconvenient cyanoethylation reaction leading to the hydrotrimer and hydrotetramer occurred.

The amount of water was not found to be narrowly critical, in general, for the reaction medium studied in detail.

The Dutch specification discloses that polar inert solvents may be incorporated in the reaction medium.

Subsequently the present applicant investigated the alkali-metal amalgam reduction of acrylonitrile and methyl and ethyl acrylate in predominantly organic solvent systems and discovered conditions under which these monomers may be converted to the corresponding hydrodimers in favourable yields based both on the reactant monomer and on the reacted alkali metal. These conditions were expected to have direct relevance to other $\alpha,\beta$ unsaturated nitriles and esters. An improvement in or modification of the process decribed in the Dutch specification was discovered. The improvement or modification was a process for reductively dimersing acrylonitrile, methyl or ethyl acrylate, or another $\alpha,\beta$ olefinically unsaturated nitrile or ester, by causing an alkali metal amalgam to interact with an homogeneous reaction medium composed of the $\alpha,\beta$ unsaturated ester or nitrile, water or methyl or ethyl alcohol, a quaternary ammonium salt having radicals of aliphatic character attached to the N atom and a polar organic solvent that is unreactive in the reaction medium and towards the amalgam, characterised in that the reaction medium has an apparent pH of from 7 to 11.5, say 8 to 10, and contains a proportion of $\alpha,\beta$ unsaturated ester or nitrile within the range of from 2.5 to 20 mole percent, a proportion of proton source (preferably water or methyl or ethyl alcohol) within the range of from 1 to 30 mole percent, preferably from 2 to 20 mole percent, and a proportion of quaternary ammonium salt exceeding 0.2 mole percent and preferably not exceeding 8 mole percent, the remainder consisting essentially of polar organic solvent.

This process is the subject of pending patent applications.

For obvious commercial reasons the amalgam which would normally be employed in any practical exploitation of the aforedescribed processes would be sodium (or, possibly, potassium) amalgam.

Reference has been made to the apparent pH of the reaction medium because in predominantly organic solvent systems a given reading on conventional pH recording equipment or a particular colour change in the case of a chemical indicator may not have precisely the same significance in terms of hydrogen ion concentrations as it would have in wholly aqueous systems. Nevertheless, it continues to be convenient and helpful to regard an effective pH of less than 7 as indicating acidic conditions and an effective pH of greater than 11.5 as indicating strongly alkaline conditions since the behaviour of, for example, acrylonitrile or methyl acrylate under such conditions is consistent with the behaviour expected for it under conditions properly regarded as acidic or highly alkaline. Thus, at an apparent pH value greater than 11.5 cyanoethylation reactions and the like are appreciably encouraged and at apparent pH values less than 7, formation of the fully reduced monomer (e.g. propionitrile) becomes increasingly favoured. For the said improved or modified process aforedescribed quaternary ammonium salts of the classes stated to be preferred in the afore-discussed Dutch specification are suitable. A quaternary ammonium salt (as say, chloride or other halide, or p-toluene sulphonate) in which the N atom is bonded to radicals of exclusively aliphatic character should be chosen with tetraalkyl ammonium salts being especially suitable. The most efficacious tetraalkyl ammonium salts are those in which there are three or four lower alkyl radicals attached to the N atom, say radicals containing from 1 to 4 carbon atoms. Best results in terms of yields of hydrodimer, say adiponitrile, on reacted alkali metal were obtained with quaternary ammonium salts containing a maximum number of the smallest possible alkyl radicals attached to the N atom consistent with adequate solubility and solubilising properties. Thus, tetraethyl ammonium salts, and methyl triethyl ammonium salts were shown to be preferred, although good results were obtained with tetra-n-butyl ammonium salts and fair results with trimethyl cetyl ammonium salts.

The requirements for a suitable solvent for the aforedescribed improved or modified process are merely that it should be compatible with, and unreactive towards, the other components of the reaction medium and it should not react with the amalgam. It must, further, cause or permit the reaction medium to attain homogeneity and dissolve the desired quantity of quaternary ammonium salt. It is for this reason that polar solvents are needed. Suitable solvents include acetonitrile, adiponitrile, dioxan, dimethylacetamide, dimethylformamide, dimethyl sulphoxide and tetrahydrofuran. Since adiponitrile is the product, the use of adiponitrile as solvent is a somewhat special case. In a continuous reaction system involving recirculation of organic reaction liquors an appreciable quantity of product adiponitrile may be present in the recycled liquors irrespective of whether or not the solvent initially employed comprised adiponitrile, and such adiponitrile is to be considered as solvent.

The process may be conducted at any convenient temperature. The range 10 to 55° C. embraces all practically feasible temperatures, and the reaction will more likely be conducted at a temperature of from 30 to 40 or possibly 45° C.

The heterogeneous nature of an amalgam hydrodimerisation reaction system leads unavoidably to a pronounced tendency for local extremes of alkalinity to occur in the region of amalgam surfaces in which regions the formation of reaction products takes place. It is very important that adequate measures be adopted for ensuring proper "pH" control in the system. Intense agitation and mixing of the amalgam and organic phases is very desirable and the use of a buffer system for "pH" control as well as moderate rate of supply of amalgam are very desirable. A phosphate buffer system is a possibility but by far the most preferred buffering agent is carbon dioxide which is markedly more soluble in, say, acetonitrile, dimethylformamide, dimethyl sulphoxide, dioxan and tetrahydrofuran as polar organic solvents than in water itself. Carbon dioxide can, therefore, provide a reserve of acidic neutralising agent for the alkali metal at all points in the organic reaction medium. The sodium bicarbonate which forms is poorly soluble in the organic reaction medium and forms a suspension conveniently lending itself to control of solids-content by cyclone-separation, sedimentation, or centrifuging. The apparent pH of a saturated solution of carbon dioxide in the reaction medium is stable at about 8.5 to 9.5, which is a very suitable range. In small-scale work, good results have been obtained using gaseous hydrogen chloride for pH control.

Where enhanced reaction rates and low mean amalgam retention times in the reaction zone are desired, measures may be adopted that result in an increase in the effective area of contact between the amalgam and the organic reaction phase per unit mass of amalgam. Preferred amongst possible chemical engineering techniques is a technique akin to fluidised bed procedures in which the amalgam is dispersed by causing the organic reaction medium to pass upwardly through a zone containing the amalgam (the amalgam constituting, preferably, the continuous phase), and into which fresh amalgam is continuously or intermittently being supplied. The rate and mode of supply of amalgam (and, of course, zone geometry) are so controlled that there is carryover of only essentially denuded amalgam to, say, a cyclone separator. A tubular reactor closed at the base by a foraminous plate is suitable for use.

General process conditions and suitable equipment for performing on a small scale the aforementioned improved or modified processes are as follows:

A convenient reaction vessel is an elongated glass flask (say, of 700 mls. capacity) having a spring-clamped removable 5-necked cover and an outlet from its sump allowing controlled withdrawal of amalgam from the vessel interior. The vessel conveniently possesses a side branch towards its sump through which the sensor device of a "pH" recorder is inserted and has a suitable stirrer fitted in a central neck of the cover. Two other inlets in the cover permit supply of carbon dioxide and amalgam to the vessel interior, a fourth inlet accommodates a thermometer and the fifth inlet is fitted with a condenser leading to a vapour trap for capturing vapours entrained in carbon dioxide leaving the condenser. A typical charge of ingredients would be 120 g. of acetonitrile, 15 g. of acrylonitrile (or 25 g. of methyl acrylate), 5 g. of water, and 10 g. of tetraethyl ammonium chloride. On a molar percentage basis these quantities correspond to 81, 7.3, 10, and 1.6 mole percent. Amalgam of, say, 0.3% sodium content is very suitable for use and its rate of supply is advantageously 0.8 mls./minutes. At high rates of supply of amalgam the avoidance of local extremes of alkalinity and of temperature with attendant oligomer formation is more difficult.

The temperature may be maintained at or around 35° C. by appropriate use of a hot air stream or an ice-bath.

A convenient reaction period for a batch process is 1 hour after which about one third of the available monomer should have reacted; but periods of from 5 minutes up to 12 hours or longer may be used.

Vigorous stirring should be employed throughout but in such manner as to ensure that only amalgam is withdrawn from the sump. The withdrawn amalgam should be substantially exhausted of alkali metal. Fresh amalgam is best supplied to uppermost levels of the charge within the vessel. The hydrodimer may be separated from the other constituents of the reaction medium by distillation.

The present invention is a modification of the aforedescribed processes. The applicant has now discovered that instead of using a combination of an amalgam and an "onium" compound, an "onium" amalgam may be employed.

"Onium" amalgams behave and analyse as though they consist of an "alloy" of mercury and an "onium" radical. "Onium" amalgams may be prepared, for example, by subjecting a solution of an "onium" salt in a substantially inert polar aprotic medium to either (a) electrolysis at a mercury cathode or (b) reaction with an alkali metal amalgam. "Onium" salts are the ionic, salt-like compounds of "onium" cations with anions, the cations being coordination complexes of non-metallic elements; and they may be represented by the general formula $(R_n M)^+ X^-$ where R is an organic radical, $X^-$ is an anion of any acid capable of salt formation and M represents the non-metallic element on which the "onium" cation is based, especially nitrogen ($n=4$), phosphorus ($n=4$) and sulphur ($n=3$).

Accordingly, our invention provides a process for the hydrodimerisation of $\alpha,\beta$ olefinically unsaturated nitriles or esters by means of an "onium" amalgam.

The "onium" amalgam may be, for example, a quaternary ammonium amalgam, a quaternary phosphonium amalgam or a ternary sulphonium amalgam. The organic radicals of the "onium" amalgam are preferably aliphatic. Quaternary ammonium amalgams are preferred especially those having radicals of aliphatic character, for example alkyl groups, attached to the nitrogen atom. As examples of suitable quaternary ammonium amalgams there may be mentioned those obtained from salts containing any one of the following cations: tetramethylammonium, tetraethylammonium, tetra-n-butylammonium, triethylmethylammonium or cetyltrimethylammonium. As examples of quaternary phosphonium and ternary phosphonium amalgams there may be mentioned those obtained from salts containing any one of the following cations: tetramethylphosphonium, tetra-n-butylphosphonium, trimethylsulphonium, triethylsulphonium, tripropylsulphonium, tri-n-butylsulphonium or triphenylsulphonium.

In the process of our invention the "onium" amalgam may be diluted with a metal amalgam (especially an alkali metal amalgam) and the results are surprisingly akin, in such case, to the aforedescribed earlier processes showing that the "onium" amalgam influences the course of reaction of the metal amalgam with the reaction medium in effect as though the reaction medium employed contained added "onium" compound.

The formation of quaternary ammonium mercury amalgams is a general property of the quaternary ammonium salts preferred for use in the earlier hydrodimerisation processes aforedescribed and preferred quaternary ammonium amalgams for the process of the present invention are those derived from such preferred salts.

Advantageous hydrodimerisation reactants, reaction procedures, and techniques when using an "onium" amalgam are the same as for the earlier processes aforementioned except in obvious respects. Thus, for example, the reaction medium need not (and ordinarily would not) contain added "onium" compound and the attainment of a particular minimum level of solubility for any given "onium" compound in the reaction medium is not a necessary condition. Apart from the fact that no added "onium" compound need be present, the improved or modified process described above for reductively dimerising $\alpha,\beta$ olefinically unsaturated nitriles or esters, such as acrylonitrile or methyl or ethyl acrylate requires the same reaction conditions when using an "onium" amalgam as when using a metal amalgam. Thus the homogeneous reaction medium which reacts with the "onium" amalgam may be defined as one comprised of (1) the unsaturated nitrile or ester, (2) the proton source, preferably water or methyl or ethyl alcohol, and (3) a polar organic solvent unreactive in the reactive medium and towards the amalgam. The apparent pH (as hereinbefore defined) of the reaction medium is from 7 to 11.5 and preferably from 8 to 10. The proportion of (1), the unsaturated nitrile or ester, in the reaction medium as defined falls within the range 2.5 to 20 mole percent, and the proportion of (2), the proton source, within the range 1 to 30 mole percent but preferably 2 to 20 mole percent, the remainder consisting essentially of (3) the polar organic solvent. Of course the "onium" species in the "onium" amalgam when it reacts with the unsaturated nitrile or ester to affect hydrodimerisation is transferred from the mercury to the reaction medium as the "onium" cation. The proportion of "onium" cation in the reaction medium is, however, irrelevant, and the efficiency of the process does not depend upon its presence in the way it does when sodium amalgam is used.

The concentration of "onium" species in the "onium" amalgam is not critical. Obviously, if the concentration is very low, large volumes of amalgam are required, but the chemical efficiency of the process is not affected. There is, however, an upper limit to the concentration imposed by the fact that above a certain ratio of "onium" species to mercury, the "onium" amalgams become solid. This ratio, for quaternary ammonium amalgams, is about 1 mole of quaternary amonium species to 11 to 12 atoms of mercury, and is fairly consistent with different quaternary ammonium ions. For tetramethylammonium amalgam this ratio corresponds with about 3% by weight. For quaternary ammonium amalgams, as with sodium amalgams, a molar ratio of about 1 mole of quaternary ammonium species to 30 atoms of mercury is very suitable. When using tetramethylammonium amalgam this ratio corresponds with about 0.9% by weight.

The neutralisation product from pH control when, for example, a quaternary ammonium amalgam alone is employed will be a quaternary ammonium compound, say the bicarbonate. In a recirculatory flow process, such neutralisation product may be removed in the course of hydrodimer (say adiponitrile) separation such that substantially none remains in liquors returned for further interaction with fresh amalgam; alternatively, the content of in situ generated quaternary ammonium salt may be maintained at some desired level in returned liquors.

Yields of adiponitrile from acrylonitrile hydrodimerisation with quaternary ammonium amalgams alone have been appreciable both in terms of acrylonitrile consumed and amalgam reacted for reaction media of preferred monomer and water content. Yields when a mixture of sodium and quaternary ammonium amalgams has been used have also been high, e.g. 70 to 90% on acrylonitrile consumed.

By hydrogenation of adiponitrile hexamethylenediamine is obtained. The latter is a valuable intermediate for the manufacture of synthetic linear polyamides (suitable for melt spinning into fibres) by polycondensation with dicarboxylic acids, especially adipic acid which gives polyhexamethylene adipamide (nylon 6,6).

The following examples illustrate the invention.

EXAMPLE 1

Tetramethylammonium amalgam (prepared as described below) was added to 5 mls. of a mixture containing 87% of acetonitrile, 10% of acrylonitrile and 3% of water. Immediate reaction occurred giving a yield of adiponitrile of 70% on acrylonitrile consumed. The tetramethylammonium amalgam was prepared as follows—

15 mls. of a saturated solution of recrystallised dry tetramethyl ammonium chloride in anhydrous acetonitrile, the acetonitrile having been dried by treatment with an aluminium calcium silicate molecular sieve (BDH type 5A), was electrolysed at 0° C. in a divided cell for 40 mins. at a current of 7–10 ma. using a mercury cathode and a platinum anode. The solution was deoxygenated and stirred using dry nitrogen and a glass frit was used as the divider. The tetramethyl ammonium amalgam thus produced in the cathode compartment was run off and washed with cold dry acetonitrile.

EXAMPLE 2

8 mls. of a tetramethyl ammonium amalgam prepared as in Example 1 was added to 10 mls. of 0.05% sodium amalagam and the resulting "joint" amalagm added to 5 mls. of a mixture containing 87% acetonitrile, 10% acrylonitrile, 3% water (v./v.) 25 mg. of adiponitrile (90% yield on acrylonitrile consumed) was obtained.

EXAMPLE 3

Tetra-n-butylammonium amalgam (prepared as described below) was added to 5 mls. of a mixture containing 87% of acetonitrile, 10% of acrylonitrile and 3% water. 5 mg. of adiponitrile, corresponding to a yield of 36% on amalgam used was produced. The tetra-n-butylammonium amalgam was prepared as follows—

15 mls. of a 0.1 M solution of dry tetra-n-butylammonium iodide in anhydrous dimethyl formamide (dried by distillation from calcium hydride under reduced pressure) was electrolysed for 60 mins. at a current of 10–12 ma. at 10° C. in a cell of the same construction as that used in Example 1. The resulting tetra-n-butyl ammonium amalgam was washed with dry dimethylformamide, followed by dry acetonitrile.

EXAMPLE 4

8 mls. of a tetraethyl ammonium amalgam prepared in anhydrous dimethylformamide in a manner similar to Example 3, except that a 0.1 M solution of tetraethyl ammonium iodide was used, was added to 10 mls. of a 0.05% sodium amalgam (w./w.) and the joint amalgam run into 5 mls. of a mixture of 87% acetonitrile, 10% acrylonitrile, 3% water buffered by passing $CO_2$ through the solution. A yield of 70% of adiponitrile on acrylonitrile consumed was given.

We claim:

1. A process for the hydrodimerization of acrylonitrile to produce adiponitrile which comprises mixing, at a temperature of 10 to 55° C., an "onium" amalgam comprising mercury and quaternary ammonium cation of the formula $(R_nM)^+$ where R is lower alkyl, $n$ is 4 and M is nitrogen, there being at least 11 atoms of mercury for one mole of quaternary ammonium cation as the sole essential reducing agent with a reductive dimerization medium containing the acrylonitrile, and having a measured pH of from 7 to 11.5, separating the reductive dimerization medium from the spent amalgam and separating the adiponitrile from said medium.

2. The process of claim 1 in which a polar insert solvent is incorporated in the medium.

3. The process of claim 2 in which the reductive dimerization medium is a homogeneous reaction medium composed of (1) the acrylonitrile, (2) a proton source and (3) polar organic solvent, and the proportion of (1) within the reaction medium as defined falls within the range 2.5 to 20 mole percent and the proportion of (2) within the range 1 to 30 mole percent, the remainder consisting essentially of (3).

4. The process of claim 1 in which the pH is controlled by adding carbon dioxide.

5. The process of claim 1 carried out under conditions of intense agitation and mixing of the amalgam and organic phases.

6. A process as claimed in claim 1 for the manufacture of adiponitrile which comprises mixing a quaternary ammonium amalgam in which the organic radicals attached to the nitrogen atom are all alkyl groups which contain 1 or 2 carbon atoms with a reaction medium composed of (1) acrylonitrile, (2) water, and (3) a polar organic solvent, in which reaction medium the proportion of (1) falls within the range 2.5 to 20 mole percent and the proportion of 2 within the range 2 to 20 mole percent, the remainder consisting essentially of (3), at a temperature within the range 10 to 55° C. and a pH of 7 to 11.5 for a period of 5 minutes to 12 hours under conditions of intense agitation, separating the reaction medium from the spent amalgam, and separating the adiponitrile from the reaction medium by distillation.

References Cited

UNITED STATES PATENTS

| | | | |
|---|---|---|---|
| 3,489,789 | 1/1970 | Dewar et al. | 260—465.8 |
| 3,496,216 | 2/1970 | Holland et al. | 260—465.8 |
| 3,458,559 | 7/1969 | Holland et al. | 260—465.8 |
| 3,462,478 | 8/1969 | Fanshawe | 260—465.8 |

OTHER REFERENCES

Kingzett's Chemical Encyclopaedia—9th edition, p. 47—1966 (QD–5–K4–1966).

JOSEPH PAUL BRUST, Primary Examiner

U.S. Cl. X.R.

260—485